United States Patent [19]
Canziani

[11] Patent Number: 5,367,466
[45] Date of Patent: Nov. 22, 1994

[54] SORTING APPARATUS AND METHOD OF CONTROL FOR THE SAME

[76] Inventor: Francesco Canziani, Via Contardo Ferrini 21, 21010 San Macario (Varese), Italy

[21] Appl. No.: 775,799
[22] Filed: Oct. 11, 1991
[30] Foreign Application Priority Data
Oct. 17, 1990 [IT] Italy .................. 21771 A/90
[51] Int. Cl.5 .................................. G08C 25/02
[52] U.S. Cl. .......................... 364/478; 364/468; 198/365; 207/563
[58] Field of Search ................ 364/468, 478; 340/825.14, 825.04, 825.8, 825.22, 825.23, 314, 502, 527, 676; 209/563, 900, 912; 198/349.95, 349.1, 365

[56] References Cited
U.S. PATENT DOCUMENTS

| | | | |
|---|---|---|---|
| 3,394,349 | 7/1968 | Day | 340/825.14 |
| 4,274,783 | 6/1981 | Eineichner et al. | 198/365 |
| 4,314,237 | 2/1982 | Darrow | 340/507 X |
| 4,471,356 | 9/1984 | Gidl | 340/989 |
| 5,018,073 | 5/1991 | Goldberg | 364/478 |
| 5,113,349 | 4/1992 | Nakamura et al. | 364/478 |

Primary Examiner—Roy N. Envall, Jr.
Assistant Examiner—Brian C. Oakes
Attorney, Agent, or Firm—Notaro & Michalos

[57] ABSTRACT

A method for controlling a sorting apparatus of the type including a plurality of mobile carriages for the transport and unloading of objects transported, in which: a predetermined advance time "t" with respect to the moment of unloading, a signal is sent to the carriage which activates the unloading motor in accordance with a predetermined scale of acceleration and for a pre-set time interval. In return a confirmation signal is generated. In the absence of the confirmation, a new signal is sent analogous to the preceding one, so as to control the unloading with an advance time "t" reduced by an interval of Δt equal to the time period between the sending of the first and second control signal.

6 Claims, 5 Drawing Sheets

SORTING APPARATUS AND METHOD OF CONTROL FOR THE SAME

FIELD AND BACKGROUND OF THE INVENTION

The present invention relates to a sorting apparatus and a method of control for the same.

More specifically, the invention refers to a sorting apparatus of the type including a plurality of carriages connected to each other and drawn along a fixed route by a chain or similar means, in which each carriage is provided with means which can receive an object and unload it in relation to prefixed collection stations positioned along the route.

These means are preferably made up of a rotating belt actioned by an autonomous motor mounted on the carriage and which picks up the necessary power supply through sliding bar supply contacts arranged along the route.

In conformity with the invention the carriages are gathered in more groups, which will be referred to hereafter as "shuttles". Each shuttle is provided with a CPU able to discern the signals on their arrival and send them to the preselected carriage, so as to activate the unloading devices after a preset time "t".

The invention provides that the carriage sends back, to the central unit controlling the system, a confirmation signal in the absence of which the control devices of the apparatus repeat the command previously sent to the carriage, varying the delay time "t" in relation to the space travelled in the meantime.

There are well known sorting apparatuses which include a plurality of carriages that move along one or more guide rails and on which there are arranged the objects to be sorted, which are then unloaded between collection devices positioned along the route.

One of these apparatuses is described for example in Italian patents No. 1,140,188 and no. 1,152,067 of the same applicant and includes a series of carriages, drawn by means of a chain or similar method, on each of which there is mounted a rotating belt actioned by its own motor which gets its energy supply, using sliding contacts, by a couple of feed bars which run in parallel to the guide rails.

All the apparatus functions are controlled by a central computer which monitors, moment by moment, the position of each carriage, due to signals generated by an encoder mounted on the wheel axis which sets the chain in motion. The commands for the activation of the motors which in turn activate the unloading belts for the transported objects are sent by the central computer to the various carriages by means of separated signal transport bars, these too arranged in parallel to the guide rails.

Hereafter, these bars which transport the signal will be indicated by the term "sectioned bars", while the term "continuous bars" or "feed bars" will indicate those bars from which the carriages pick up electric energy necessary for the supply of their motors and other devices on board.

The supply circuit of one of these well known apparatuses is given in diagram form in FIG. 1. FIG. 1A is perspective view of the belt and motor of FIG. 1.

Here, 1 indicates the carriages, each of which has on board a rotating belt 2 which acts as a transport floor for the objects 3 and which is actioned by its own motor 4.

The motors 4 by way of sliding contacts 5 pick up the necessary power supply from sectioned bars placed along the route, constituted by a plurality of conductors 6, each of a length less than the pitch of a carriage and separated from each other by insulating elements 7.

The functions of the system are managed by a central computer, for example a PLC8, which controls a series of power supplies or servo-amplifiers 9 which are earthed and each connected to a section of sectioned bar 6.

This solution, however, involves numerous inconveniences. Each amplifier must be able to transmit a current with an intensity greater than 15 Amp. This means that the connection to the supply bar must be made with cable of suitable dimensions.

When one considers that a normal system of this type often includes 200 or 300 carriages which sort towards what is often a similarly elevated number of collection stations, it is easy to understand how complex the apparatus is in constructional terms.

In addition to having to reposition a high number of earth actions, connecting each of them to the relevant part of the sectioned bar, problems then arise in relation to the control of electrical power in so far as the transmission of powers at such a high level through sliding contacts causes sparks. This cause the quick wearing out of the conductors.

To limit these inconveniences it is then necessary to very precisely control the activation of each section of bar, such that the transmission of power occurs only when the sliding contacts have passed the interruption zone between two consecutive bars.

The activation, in consequence, must be made with extreme precision with respect to the position of the machine, with restricted margins of error. This limits the performance, in so far as a reduced period of time is available for carrying out the unloading. When the collection stations are many and therefore of restricted dimensions, there are few milliseconds available (approx. 200) to give the rotating belt 2 the necessary acceleration for correct unloading of the object.

Other inconveniences of this solution derive from the fact that each time an amplifier is burnt the corresponding output is lost. This can be recovered only by stopping the system for the necessary repair work.

Finally, the amplifiers must be exaggeratedly sized in relation to real need, to avoid over-heating and ensure a correct functioning even in the case, although not frequent, where several carriages unload consecutively at the same station.

These inconveniences have been resolved only in part in apparatuses known more recently, the supply layout of one of which is illustrated in FIG. 2.

In these apparatuses the servo-amplifiers are mounted one per carriage and pick up the supply power by means of sliding contacts 10, from continuous bars 11.

The sectioned bars 6, in consequence, receive only control signals coming from the PLC8, and with this solution, thanks to the fact that the power to be transmitted is minimal, dangers due to sparks are avoided. There is in addition a greater amount of time available for accelerating the belt, which allows for more precise control of unloading functions.

On the other hand this solution involves a greater number of sliding contacts and therefore a greater complexity of connections, resulting in a cost which is significantly higher than the preceding solution.

For this reason there is felt to be in the sector a need to be able to use apparatuses of the above-described type, but which have limited production cost, are easy to maintain, and which allow the elimination or at least drastic reduction of the number of harnesses, thereby possibly avoiding the need to make use of sectioned bars.

SUMMARY OF THE INVENTION

To resolve the above-mentioned problem the present invention offers a sorting apparatus of the type above-described, in which the carriages are connected in groups, on each of which there is a micro computer mounted, able to distinguish the arrival signals and send them to the carriage which must carry out the unloading. The signals are sent along the continuous bars and provision is made for each carriage to send back a confirmation return signal. In the absence of this signal the central computer again sends the command, adjusting the other parameters in relation to the time which has passed.

BRIEF DESCRIPTION OF THE DRAWINGS

The present invention will now be described in detail, though only as a non-limiting example, with special reference to the figures enclosed where:

FIG. 1A is a perspective view of a belt and motor for the apparatus FIG. 1;

DESCRIPTION OF THE PREFERRED EMBODIMENT

Figure 1:
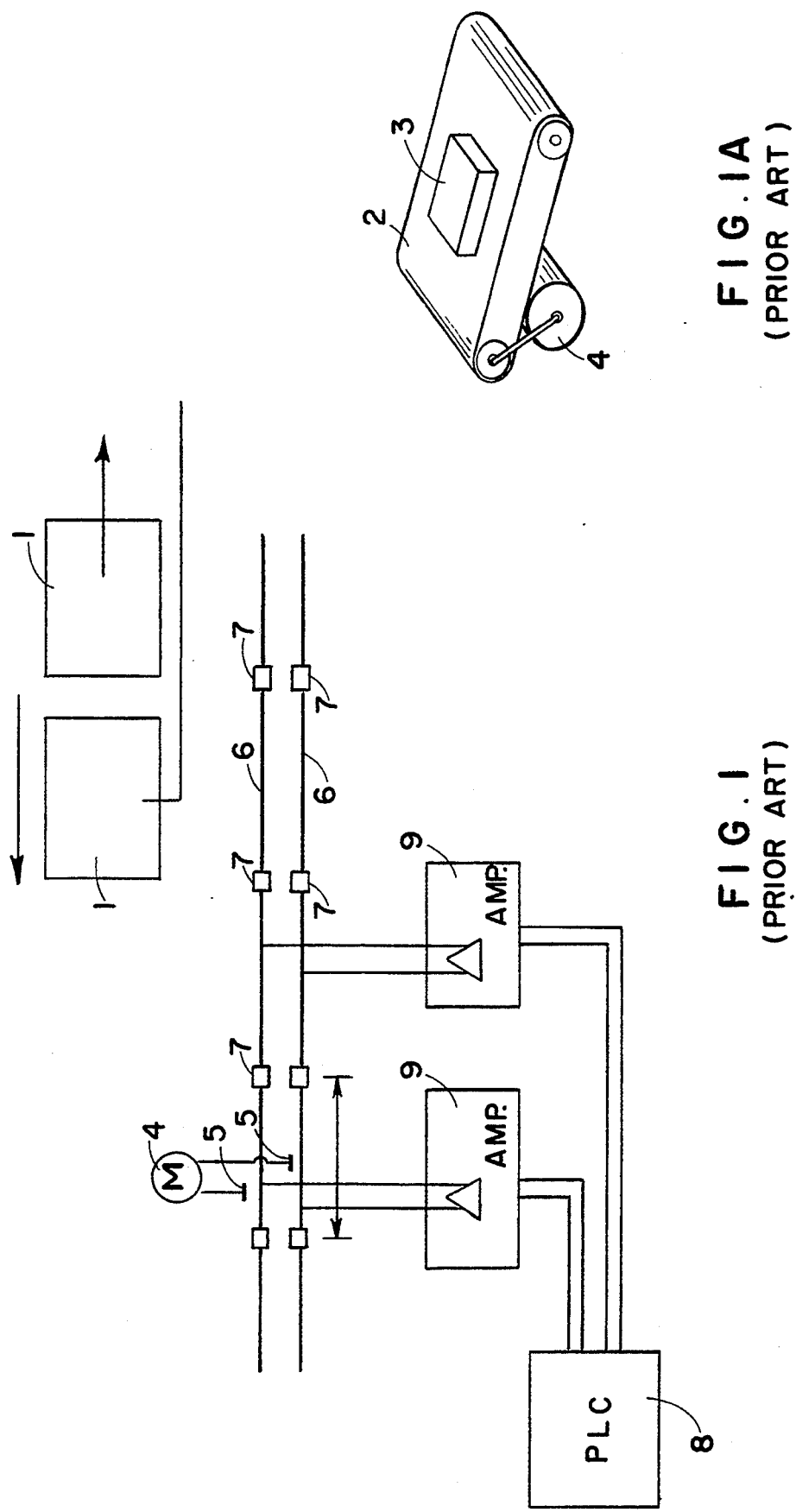
FIG. 1 is a schematic block diagram showing a power and signal layout for an apparatus of the prior art.
Figure 2:
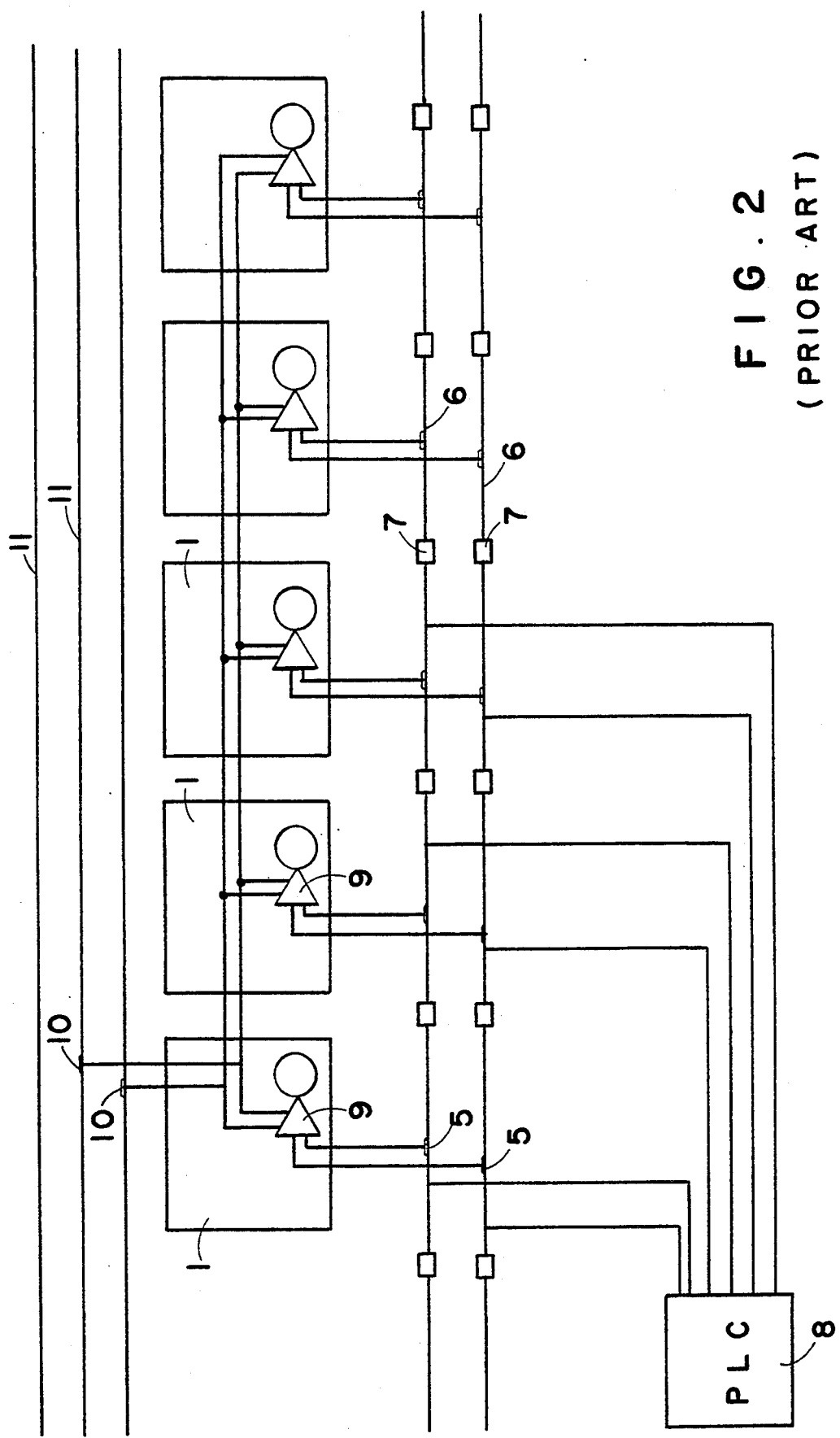
FIG. 2 is a view similar to FIG. 1 of another prior art layout.
Figure 3:
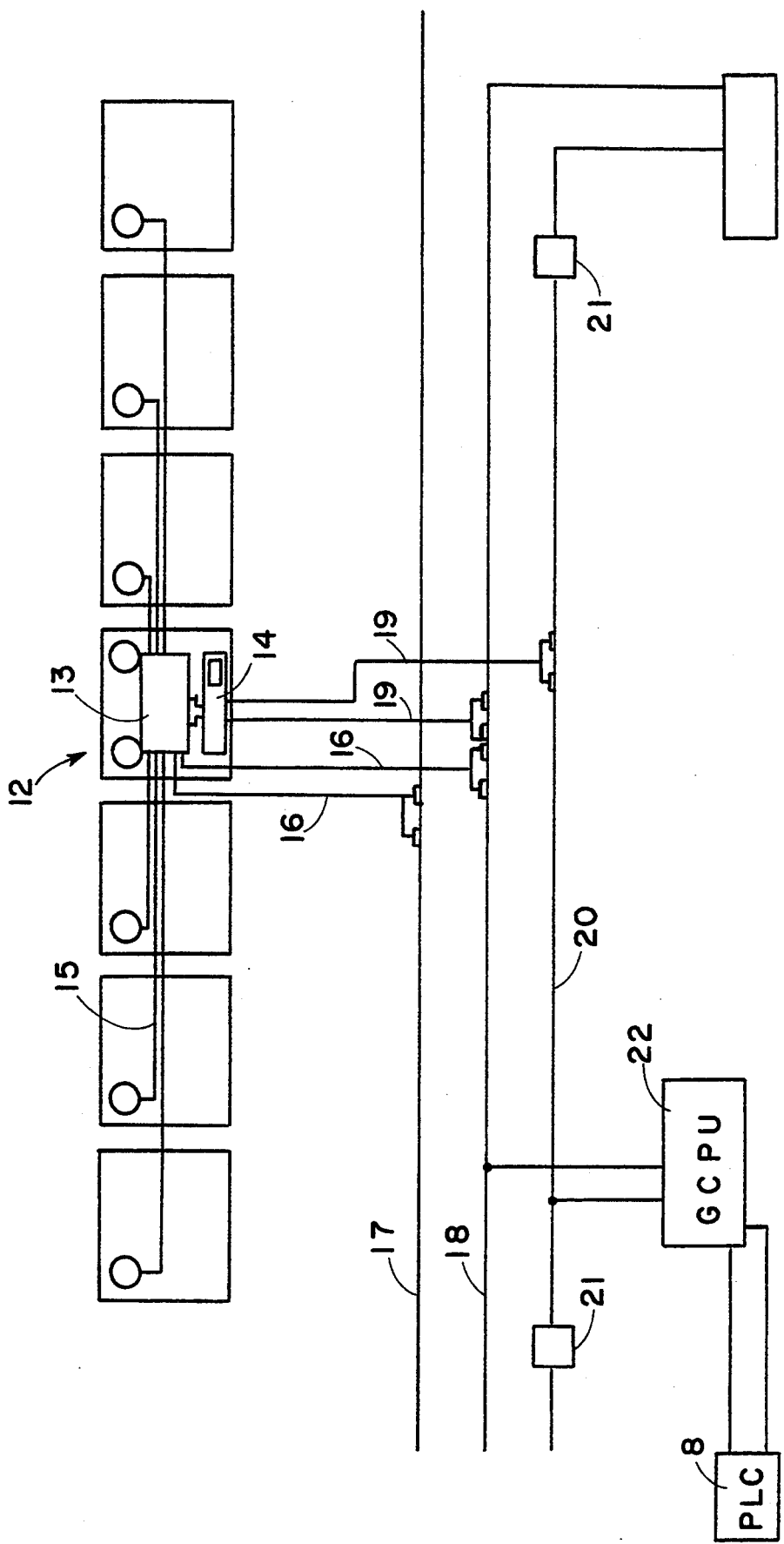
FIG. 3 shows in schematic form the connections in an apparatus according to the invention.

In the system according to the invention, (FIG. 3) the carriages are gathered in groups, which in the following will be indicated with the term "shuttle", each one including a certain number of carriages, for example 7.

In each shuttle a carriage 12, which we will indicate as the main carriage, is provided with a hauling motor and has on board a multiservo box 13, including eight actions arranged respectively for the control of the hauling motor and the unloading devices on each shuttle carriage. A CPU 14, which will be indicated as a MCPU (mobile CPU) is assembled on the main carriage and is connected by a BUS to the multiservo box.

On the CPU card a series of microswitches is present, or bridges, which can be set in various modes, to define an identification code for the card and thereby for the shuttle.

Appropriate harnesses 15 of the well known type connect the multiserve box with the motors that activate the unloading devices for each carriage.

The actions mounted on the carriage 12 pick up power through two pairs of sliding contacts 16, which contact continuous supply bars 17 and 18, the first at a certain voltage, for example at 70 Volts, and the second at 0 Volts.

The MCPU 14 on the other hand receives its signals through, pairs of sliding contacts 19 one of which engages the supply bar 18 at 0 Volts and the other the sectioned bar 20.

The bar 20 is made up of a series of sections separated from each other by insulating elements 21.

The insulating elements 21 are greater in size than the sliding blocks 19, while the length of the bar sections 20 can vary within wide limits, though as a matter of preference there will be a length of approximately 8–9 times the length of a shuttle.

To each of the sections which make up the supply bar 20 there is connected a control unit or GROUND CPU (GCPU) 22, in its turn connected to the PLC or central computer 8.

Each GCPU, in consequence, having received commands from the computer 8, processes them and sends suitable signals along the section involved, to manage the shuttles which move along this section of the route.

The connection between the central computer 8 and the ground CPU 22 is of a standard type, for example a connection of the RS 422 type.

A characteristic of the invention is instead the particular type of connection between the ground CPUs and those mounted on each shuttle.

Figure 4:
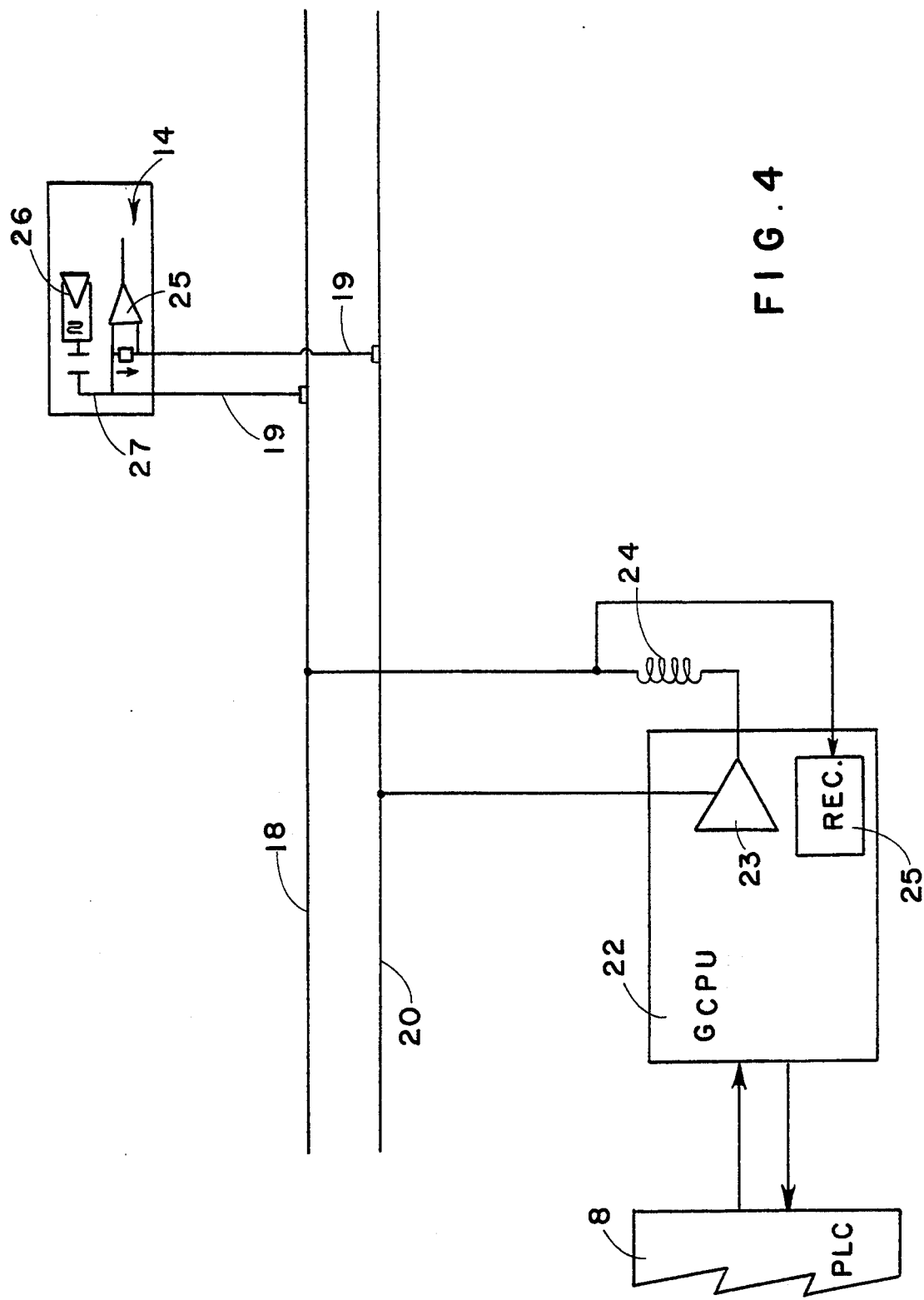
FIG. 4 is a schematic layout for the carriage control devices.

This connection is set out in the diagram in FIG. 4.

Each ground CPU transmits baseband (or using other communication techniques like frequency modulation, phase modulation, amplitude modulation, etc.), amplified signals by means of a power amplifier 23. These signals, along bars 18 and 20, are picked up by sliding contacts 19 and arrive at the MCPU 14.

As a consequence of the transmission from the ground to the carriage, by means of which the larger part of the information signals are exchanged, occurs in baseband with elevated energy levels, in order to have a high signal/disturbance ratio.

On the basis of the instructions received from the central computer 8, each GCPU 22 sends to the shuttles which are on its section of the route power control signals for the haulage motor and signals on the basis of which the MCPU 14 activates the unloading devices of the individual carriages, according to the modalities which will be illustrated below.

The amplifier 23 is connected to the supply bar by means of an inductor 24 arranged in series.

The ground CPU also includes a tone detector 25 which is inserted on the line connecting the amplifier 23 with the supply bars, in a point set between the impedence 24 and the bars themselves.

On the MCPU 14 there is a demodulator receiver 25 and a tones generator 26 connected, by means of a capacity 27, to the sliding contacts 19.

The generator 26 is of the type able to generate a high frequency signal, for example 200 KHz.

The functioning occurs as follows:
on each MCPU a series of parameters is memorised on the basis of which the motor connected to the unloading belt is activated with a certain scale of acceleration and for a set time.

Each GCPU 22, on the basis of the instructions received from the central computer 8, processes a command which, appropriately treated is sent from the amplifier 23 along the respective section of bar 20.

This signal, which contains all the information necessary to manage the shuttles which are found to pass in relation to the area of the route controlled by the respective GCPU, arrives at the receiver 25 where it is appropriately demodulated and sent from the CPUs of the individual shuttle to the respective carriages.

In a preferred embodiment of the invention, the signals sent by the amplifier 23 are eight byte signals; of these eight bytes the first four contain a message with the address of the shuttle to which the command is directed, the address of the carriage which must be activated, a control signal for the hauling motor couple and a signal with the code of the operation to be carried out; in particular with a selection code for the unloading modality already memorised in the MCPU and that of the delay time "t" with which the unloading is to be activated.

The next four bytes contain the same complemented information, that is to say an analogous signal to the preceding one but in which all the 1's and 0's have been exchanged.

This allows the MCPU to carry out a check on the command received and, if positive, to send a confirmation signal to ground. In this way the MCPU compares the first four bytes with the four subsequent ones and, where they match, activates the tone generator 26 which then produces a high frequency signal for a duration of, for example, 5 milliseconds.

This signal crosses the capacity 27 and, by way of the sliding contacts 19 and the supply bars arrives at the GCPU. Here the high impedance of the inductor 24 acts such that the signal passes to the tone detector 25 so that the GCPU has confirmation that the command sent has been received correctly.

In the absence of any confirmation signal after a certain time from the sending of the first signal, the GCPU sends a second command analogous to the preceding one, but in which the delay time is varied, reducing it by an interval of Δ"t", equal to the time spent between the sending of the first and second command.

Naturally this operation can be repeated more times, until the shuttle is positioned in relation to the section controlled by a specific GCPU.

The possibility of commanding an activation after time t is provided by the fact that the sorter is of a synchronous type and therefore it is possible to provide in advance (for example 500 milliseconds) the operations which must be carried out. This characteristic is of fundamental importance for the two following reasons:
  the possibility of communicating with the capacity to retransmit the message if there are any errors in the transmission (having communicated in advance an action to be carried out after 200 milliseconds and in the absence of confirmation, it is possible to retransmit after 50 milliseconds the same action to be carried out after 150 milliseconds);
  the possibility of delaying the communication of commands which must, for statistical reasons, be carried out in the same instant (if, for example, 10 different actions must be carried out in instant t, the commands could be communicated in the following way:
  ACTION 1: within 400 milliseconds;
  ACTION 2: within 380 milliseconds;
  ACTION 10: within 220 milliseconds.

The invention therefore makes it possible to take advantage of the predictability of the phenomena so as to drastically reduce the frequency band otherwise necessary and to create the prerequisites for a simple and practical application.

Figure 5:
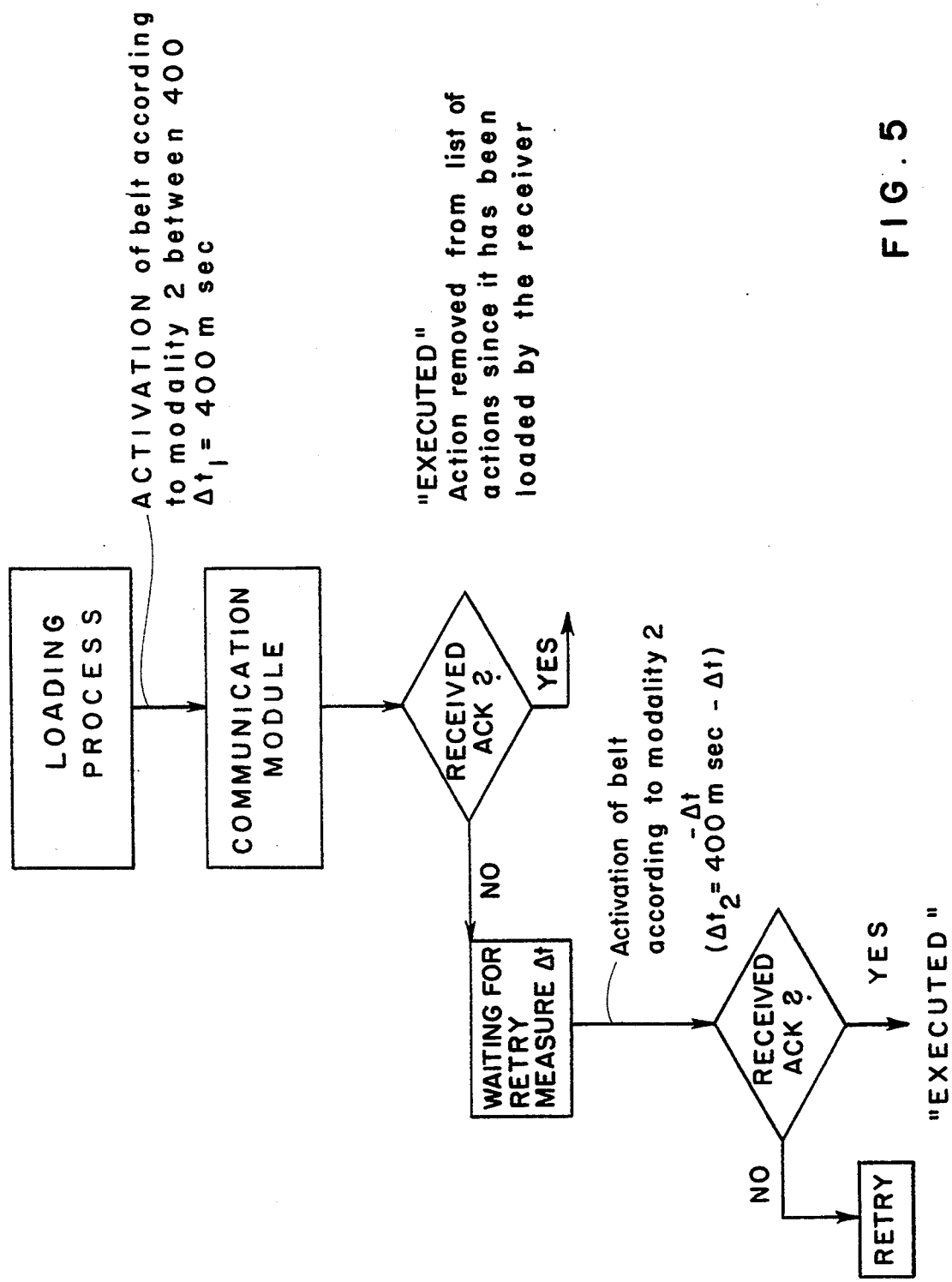
FIG. 5 is a flow chart illustrating the management method for the apparatus.

FIG. 5 is the flow chart in relation to the management procedure of the MCPU by the ground CPU. It will be clear, at this point, just what the advantages of this invention are.

Due to the fact that it exploits the same supply bars to send signals to the CPUs mounted on the carriages, the number of harnesses needed is drastically reduced.

A person skilled in the art will then be able to introduce numerous modifications and variants, which must however remain within the definition of the present invention.

I claim:

1. A method for controlling a sorting apparatus of the type including a plurality of groups of mobile carriages moving along a fixed route, each carriage equipped with a rotating belt driven by an unloading motor which receives electrical power from power supply bars arranged along the route, and which carries out an unloading of transported objects from the belt, each group containing a plurality of carriages with one carriage in each group having a hauling motor for moving the group along the fixed route, the one carriage also including a multi-servo box operatively connected to the unloading motor of each carriage in the group and including signal processing means, signal supply bars lying along the route and operatively engaged with the signal processing means for supplying and receiving command signals and confirm signals, to and from the signal processing means, a servo-amplifier at a fixed location with respect to the fixed route, connected to one of the signal supply bars for supplying and receiving command and confirm signals to and from the signal supply bar, the method comprising the steps of:
  sending an initial command signal which is a baseband signal, from the servo-amplifier to the signal processing means for a carriage of the group, for activating the unloading motor of the carriage according to a set acceleration scale and for a prefixed interval of time, the initial command signal including a set advance time "t" before which the initial command signal will function to activate the unloading motor;
  generating and returning a confirm signal which is a high frequency signal, from the signal processing means and the carriage, to the servo-amplifier; and
  in the absence of the confirm signal sent to the servo-amplifier, sending from the servo-amplifier to the signal processing means for the carriage of the group, a new command signal which is a baseband signal that is analogous to the initial command signal, the confirm signal containing a reduced advance interval, which is equal to the set advance time less a time which has passed between the initial and the new command signals.

2. A method according to claim 1, including sending the initial command signal to one of the plurality of mobile carriages, checking a correctness of the command signal at the one mobile carriage and, if the command signal is correct, transmitting the command signal to at least one other of the mobile carriages of the plurality of the mobile carriages.

3. A method according to claim 1, wherein at least one of the power supply bars also acts as one of the signal supply bars, the method including decoding the command signals which are supplied from the signal supply bar which also act as the power supply bar.

4. A method according to claim 1 including providing a mobile CPU on the one carriage of the group for functioning as the signal processing means for receiving command signals from the servo-amplifier and for returning confirm signals to the servo-amplifier, and including supplying drive command signals from the servo-amplifier to the mobile CPU for controlling the hauling motor.

5. A method according to claim 4 including connecting a ground CPU to the servo-amplifier for controlling the servo amplifier to supply and receive the command and confirm signals.

6. A method according to claim 5 including using the ground CPU to generate the baseband command signals which are low frequency signals, the method including generating high frequency tone signals using the mobile CPU to serve as the high frequency confirm signal.

* * * * *